United States Patent [19]

Komorek et al.

[11] 3,825,167
[45] July 23, 1974

[54] EXPANDING MANDREL OR CHUCK

[75] Inventors: Anthony J. Komorek, Warren, N.J.;
Lawrence R. Damour, 16 Chesler
Square, Succasunna, N.J. 07876

[73] Assignee: said Damour, by said Komorek

[22] Filed: Dec. 26, 1972

[21] Appl. No.: 318,519

[52] U.S. Cl. .................. 279/2, 242/72 B, 269/48.1
[51] Int. Cl. ........................................... B23b 31/40
[58] Field of Search............ 279/2; 242/72 B; 82/44;
269/48.1

[56] References Cited
UNITED STATES PATENTS

| 2,062,421 | 12/1936 | Lindbom | 279/2 X |
|---|---|---|---|
| 2,627,773 | 2/1953 | Barnett | 279/2 X |
| 2,711,863 | 6/1955 | Grettve | 242/72 B |
| 2,741,093 | 4/1956 | Riker | 242/72 B X |
| 3,214,109 | 10/1965 | Gadde et al. | 242/72 B |

FOREIGN PATENTS OR APPLICATIONS

| 1,170,649 | 11/1969 | Great Britain | 242/72 B |
| 653,299 | 12/1962 | Canada | 242/72 B |
| 654,990 | 1/1963 | Canada | 242/72 B |

Primary Examiner—Andrew R. Juhasz
Assistant Examiner—Z. R. Bilinsky
Attorney, Agent, or Firm—Ralph R. Roberts

[57] ABSTRACT

This invention pertains to an expanding mandrel or chuck in which air or hydraulic fluid is fed to and into a resilient tube arranged in a helical spiral. This tube is carried by and in grooves formed in a body and when pressurized air is fed into the tube it is expanded in a controlled manner to move three longitudinally disposed and retained jaws outwardly to positively drive a supported member carried on the chuck. In an alternate arrangement the jaws are made smooth to provide a controlled torque shaft which, with fixed retaining collars, provide a differential rewind shaft.

13 Claims, 14 Drawing Figures

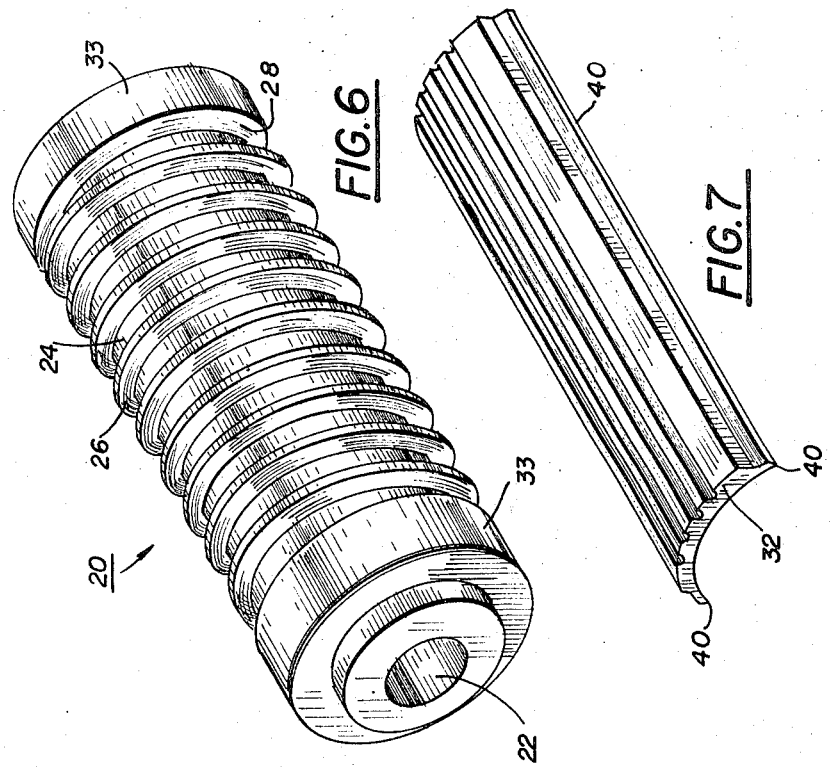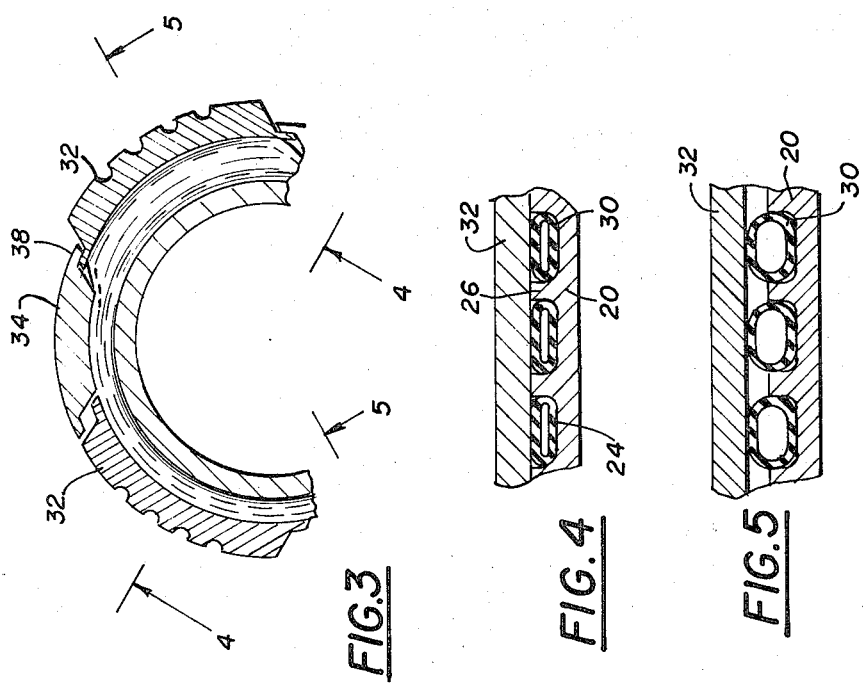

PATENTED JUL 23 1974 3,825,167

EXPANDING MANDREL OR CHUCK

BACKGROUND OF THE INVENTION

1. Field of the Invention

With reference to the classification of art as established by the U.S. Patent Office this invention pertains to the general class of "Winding and Reeling" and more particularly to the subclass of "supporters and holders."

2. Description of the Prior Art

Expanding chucks and mandrels, of course, are well known and art directed in particular to the use of a hydraulic fluid or air to expand segments is extensive. However, most of the known expanding mandrels using air or hydraulic fluid in combination with resilient tubes have the resilient tube-like expanding members arranged in a longitudinal manner. These tubes are usually connected to a header system and under pressure move certain jaw members of the mandrel outwardly. Springs or the like are used to cause these expanding portions of the mandrel to be drawn back into seated position when the pressure has been relaxed. These header systems and longitudinal arrangements of the resilient tubes of these prior art chucks are often less than satisfactory since the pressures usually are unequal and leaks often occur. In the present invention the element which receives the air or hydraulic fluid and becomes pressurized is a single spiral-wound tube which is retained in a formed groove so as to be restrained from lateral expansion and blowout. This tube is confined locally against expansion by means of three fixed segments and is expansible locally outwardly within established limits by means of three movable jaws which are moved under the influence of pressure in the tube.

Expanding mandrels using spiral-wound resilient tubing are shown in Canadian Patent No. 654,990 to SCARISBRICK which issued on Jan. 1, 1963 and Canadian Patent No. 653,299 which issued to CRESSMAN on Dec. 4, 1962. In these patents the spiral-wound tube is unrestrained except for the outer sheath which is of expansible material such as cloth or a rubberized or resilient material used to restrain a blowout of the tube member which is a rubber tube. In the present invention the retention of the resilient tube is in preformed metal grooves and the amount of expansion locally permitted the tube is very small. The wall thickness of the elastic tube is made sufficient to prevent weakening and blowing out when line air pressure is applied to the tube and the movable jaws which are moved outwardly by the expanding rubber tube expose a very small unconfined restraint of the tube.

It is to be noted that in the Canadian patents above-identified that the torque is transmitted from the spiral-wound rubber tube to the shell which it supports and turns. In the present invention the resilient, spiral-wound tube, when pressurized, pushes three metal jaw members outwardly into driving engagement with the core or shell to be driven. These jaws are slidably retained by fixed means secured to the body member so that driving torque is not transmitted to or from the rubber tube.

The present invention permits sectionalizing of the mandrel to drive locally engaged portions of the supported roll or core and also to suit particular conditions including making small drive units of about one inch diameter.

SUMMARY OF THE INVENTION

A metal body has a spiral groove formed in an intermediate portion thereof. A rubber tube is sized to snugly fit in this groove and is closed at one end and is connected to an air inlet source at the other end. Three retaining plates are secured to the body and in one embodiment retain three outwardly movable drive jaws. The drive torque is transmitted from the movable jaws to the retaining plates and body.

In an alternate embodiment a rewind shaft is provided in which the drive jaws are made as movable shoes with their exterior surfaces smooth and longitudinal edges rounded. Stop collars adapted to be removably secured to the retaining plates are provided with relief portions enabling the movable shoes to be displaced outwardly to engage the inner surface of supported cores. Air is fed to the helical tube through the central portion of one end of the shaft.

In addition to the above summary the following disclosure is detailed to insure adequacy and aid in understanding of the invention. This disclosure, however, is not intended to cover each variation in form or additions of further improvements. For this reason there has been chosen a specific embodiment of the expanding mandrel or chuck as adopted for use with a helically wound rubber tube used to move jaw members outwardly.

This specific embodiment has been chosen for the purpose of illustration and description as shown in the accompanying drawings wherein:

BRIEF DESCRIPTION OF THE DRAWINGS

FIG. 3 represents a partly fragmentary sectional view in which the movable chuck jaws are in both a nonexpanded and in an expanded condition;

FIG. 4 represents a fragmentary sectional view of the mandrel, this view taken on the line 4—4 of FIG. 3 and showing the resilient tubular member in a nonexpanded condition;

FIG. 5 represents a fragmentary sectional view of the mandrel, this view taken on the line 5—5 of FIG. 3 in which is shown the resilient member in an expanded condition and with the chuck jaw moved outwardly to gripping and driving condition;

FIG. 6 represents an isometric view of the core member of this invention;

FIG. 7 represents an isometric view of one of the three movable chuck jaws, the jaw being externally ribbed to provide improved gripping action;

In the following description and in the claims various details will be identified by specific names for convenience; these names, however, are intended to be generic in their application. Corresponding reference characters refer to like members throughout the several figures of the drawings.

Figure 2:
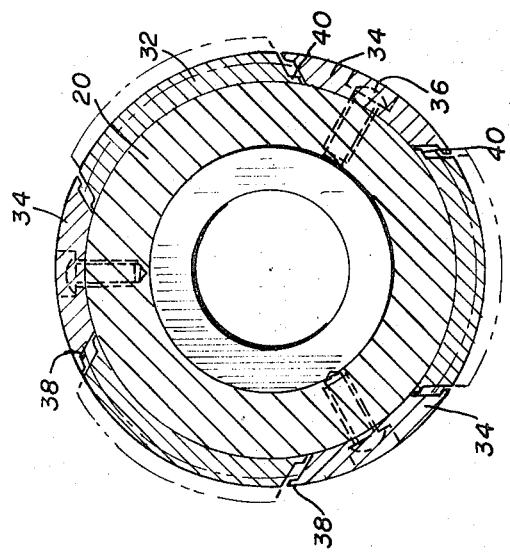
FIG. 2 represents a sectional end view taken on the line 2—2 of FIG. 1 and showing the metal portions of the mandrel and in particular the movable chuck jaws and the means for retaining and positively driving the movable chuck jaws.

The drawings accompanying, and forming part of, this specification disclose details of construction for the purpose of explanation of the invention, but it should be understood that structural details may be modified without departure from the concept and principles of the invention and that the invention may be incorporated in other structural forms than shown.

DESCRIPTION OF THE PREFERRED EMBODIMENT

The present embodiment is contemplated to illustrate the general principles of this expansible chuck or mandrel in which a resilient helical wound tube is pneumatically or hydraulically actuated. The embodiment shown has a body member generally indicated as 20 in which may be formed a through bore 22 disposed for mounting upon a shaft which, when required, is used with the machine which feeds and winds or unwinds the material being processed. The outer surface of this body 20 has its intermediate portion formed with a helical or thread-like groove 24 which is shaped to provide a smooth troughway. The groove is spaced so that between convolutions a very small or narrow wall portion 26 is provided between adjacent grooves 24. The two ends of this helical groove are terminated with short straight portions 28. In these straight end portions and in the intermediate spiral grooved portion is mounted and retained a rubber tube member 30. This groove and mounted tube are particularly shown in FIGS. 1, 4 and 5. The tubing 30, when mounted in the groove 24, is a snug fit in the groove and when a retained movable jaw member 32 is placed on top of the tubing the tube in an unpressurized condition is in a more-or-less partially flattened condition as depicted in FIG. 4. The tubing is retained in a desired helical or spiral spacing by means of the shoulder wall or walls 26. When air or hydraulic pressure is fed into the tubing 30, the tubing is locally expanded where permitted to push jaw member 32 outwardly to a determined limit. When the movable jaw engages the core of the member which it is to support and drive, the jaw 32, of course, is stopped against further movement. This outward movement is best seen in FIG. 5 wherein it is to be noted that the groove 24 retains a large portion of the tubing.

As seen in FIG. 2, the body member 20 is shown with a supporting bore 22 for mounting on a shaft, not shown. The ends of the body 20 are formed with shoulders 33 whose outer diameter is at least a sliding or loose fit for the member with which the expanding mandrel is to be used. Between the end shoulders 33 are attached three fixed longitudinal retainers 34 whose outer diameter surfaces are substantially the same as shoulders 33. These retainers are attached to body 20 by means of screws 36. The movable members 32 are retained and slidably guided by members 34 whose sides are formed with ear portions 38 which in mounted condition engage shoulder portions 40 formed on the longitudinal edges of movable members 32. These edges are sized and contoured so as to slide outwardly in the formed guides until stopped by engagement of ear 38 with shoulder portions 40.

Figure 1:
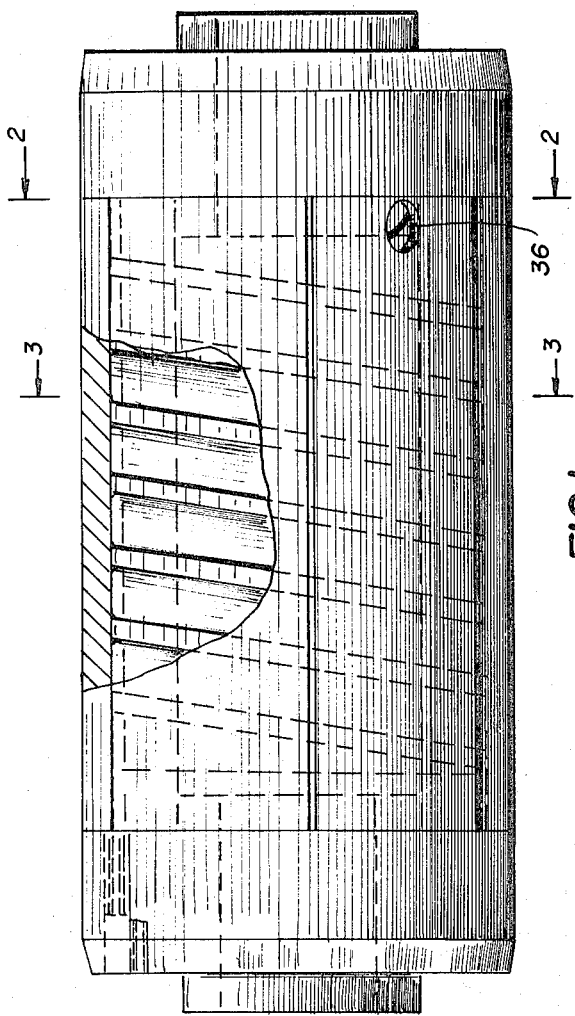
FIG. 1 represents a side view of an expanding mandrel of this invention with a portion broken away to show the internal construction of the core and a helically wound tubing mounted in a retaining groove.
Figure 8:
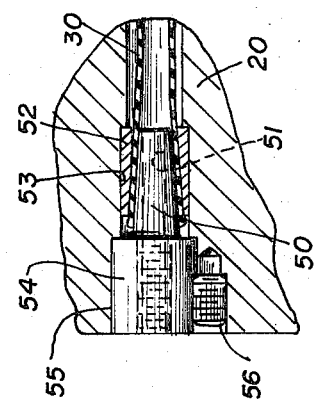
FIG. 8 represents a fragmentary sectional view showing a preferred construction for retaining one end of the flexible tube, this end as well as retaining this tube in the mandrel body also having value means for retaining and releasing the air in the tube.

The rubber tubing 30 has its intake end mounted in the left end of body 20 as seen in FIG. 1. From the inlet end, the tube 30 extends rightwardly in helical groove 24. This inlet construction, as seen in FIG. 8, has the inlet end of the tube 30 slid over a tapered plug 50 which has a through bore 51. This mounted end of the rubber tubing 30 is secured on this hollow tapered plug 50 by means of a sleeve 52 having an internally tapered bore. This sleeve is sized so as to be seated in a shouldered bore 53 formed in the body 20. An internally threaded member 54 is retained in a larger bore 55 formed in the end of the body 20 and by means of a set screw 56 is secured in this larger bore 55. Set screw 56 is rotatably mounted in a threaded semicircular recess formed in the body 20 and like mating threaded semicircular recess portion formed in the outer surface of the plug 54. This retention by set screw 56 is a fastening means in the manner of a threaded "Dutchman." The threaded inner portion of plug 54, although not particularly shown in detail, is threaded for mounting therein of a valve core in the manner of a valve core removably mounted in a stem of an automobile tire wheel or inner tube. Through this valve, air or other fluid may be fed into the rubber tube 30 and released from the tube by causing the valve to be opened or unscrewed.

If desired, tapered plug 50 and member 54 may be made as a one-piece unit. The set screw 56 retaining the larger member portion 54 engages only the outer diameter portion. Sleeve 52 may be of a shrinkable plastic or a metal spring-like clip. The sleeve 52 is used to secure the tube 30 to plug 50 in an airtight manner and to prevent dislocation therefrom.

Figure 9:
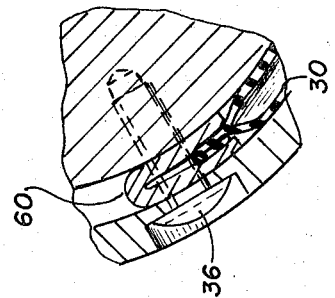
FIG. 9 represents a fragmentary sectional view showing a clamp means for retaining and closing the distal end of the flexible tube.
Figure 10:
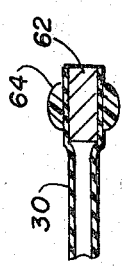
FIG. 10 represents a sectional view of an alternate means of plugging and closing the distal end of the tube.

Tube End Closing as Seen in FIGS. 9 or 10

Referring next to FIG. 9, the end of the distal rubber tube 30 may be closed by means of a metal C-shaped member 60 into which the folded end of tube 30 is inserted. The legs of the member 60 are further moved toward each other by means of one of the screws 36 which secure retainers 34 to body 20. The clamped, folded end of the tube is then air or fluid tight.

Referring next to FIG. 10 there is depicted an alternate manner of closing the distal end of the tube 30. In this assembly a rubber or slightly resilient plug 62 is inserted into the end of the rubber tube 30. By means of a plastic or metal sleeve 64 the rubber tubing 30 is clamped in position on the plug. The clamping is made sufficiently tight so that this end is air and fluid tight. When the assembly of the chuck is being made, this end is placed under a retainer 34 and as the retainer is secured to the body 20 by a screw 36 this end is gripped and retained.

Assembly of Chuck of FIGS. 1 through 10

The chuck or mandrel of this invention is easily assembled and when necessary may be easily repaired. Body 20 is machined to the determined length and where required for mounting upon a support shaft, not shown, a bore 22 is provided. In many instances the chuck or mandrel is a self-supporting unit and has no bore 22. A determined length and size of rubber tubing 30 is prepared for insertion into the groove 24 previously formed.

To mount the tube 30 into the body the end of a length of tubing is assembled to plug 50 and sleeve 52 is then moved into securing position as in FIG. 8. The tubing is then fed through the hole 53 and to the helical groove 24 in the body. The tubing is helically mounted in the groove until the right end of the groove is reached after which the tubing is cut to the nesting length and the end closed by the method of FIGS. 9 or 10. If a separate plug 54 is used it is inserted into the bore 55 and is forced in and retained by screw 56 to insure that the open end of the rubber tube 30 is maintained in a tightly secured position. Threaded plug 54 engages plug 50 and further pushes this plug into the tapered socket provided by sleeve 52. Where portion 54 is integral with tapered portion 50 the mounting is accomplished at the initial insertion. This plug 54 or portion is maintained in its installed position by means of the headless set screw 56 which engages threads in both bore 55 and the side wall of plug 54 providing the threaded "Dutchman" retention. The movable driving jaws 32 are then placed in position between the shouldered ends 33 and then retained in position by means of the fixed retainers 34 which are secured in position by screws 36 which enter and engage tapped holes in body 20 to secure the fixed retainers to the body.

In use, the assembled unit may be the complete mandrel or may be mounted upon a shaft or support member, not shown, and as a mandrel or chuck is rotated by apparatus in which it is to be used. The roll or core which is to be rotated by the machine is placed upon the expanding chuck or mandrel and when the roll or core is in the desired position air is fed into the threaded entryway of plug 54 and into the rubber tube 30 which then expands, where it is able, to push the movable driving jaws 32 outwardly as seen in FIG. 3. The jaws engage and center the core or roll to be driven by this expanding mandrel. Usually the expansion movement outwardly of the jaws 32 is a matter of about a sixteenth of an inch maximum travel for each of the jaws. Since the tube 30 is a continuous tube and is wound spirally the outward pressure of the expanding tube 30 on each of the movable jaws 32 is equal. This pressure causes the jaws to centralize the core or roll which is carried by this chuck or mandrel of this invention.

The feeding of air into the tube 30 through the opening in plug 54 causes the valve core to be displaced inwardly during this feeding. When the desired expansion of the tube 30 has been accomplished, the air supply feeding nozzle is removed from plug 54 and the valve core closes. This leaves the expanding mandrel in an expanded condition with no connection to the air supply source and the mandrel or chuck is free to rotate in the machine in which it is used. When it is desired to release the air from the unit the valve in member 54 is pushed inwardly as in the manner of deflating an automobile tire or inner tube. The air is rapidly expelled from tube 30 and jaw members 32 move into the retracted position as seen in FIG. 4. The supported core or roller is then slid from the expanding mandrel and a new core or roll is then mounted on the chuck.

During operation of the mandrel or chuck the movable jaws 32 are retained by the members 34 with the mating edges 40 in engagement with the edges of member 34 to provide a positive drive in which the torque is not transmitted to tube 30. Whether the closed end of the tube is sealed by the folded end gripped as in FIG. 9 or by a plug as seen in FIG. 10, the replacement of the rubber tube 30, when required, is very simple. It is recognized that the repetitive expansion and contraction of the tube may eventually cause wear or fatigue sufficient to form a leak in the tube 30. When this occurs it requires replacement. Screws 36 are loosened and the retaining members 34 and screw 36 are removed. Also removed are jaws 32 exposing the tube 30. Screw 56 is removed and members 50, 52 and 54 are pushed from the end of the body. A new tube is then cut to a determined length and the inlet end of the tube, as above, is assembled to plug 50, sleeve 52 and secured by valve plug 54. Reassembly then continues as above-described. The wall thickness of the tube 30, in use, is made rather ample in order that blowout possibilities of the tube as it moved into the gap is minimal. The space between movable jaw 32 and wall 26 is so small that the wall thickness of the tube has a safety factor of two or three. This safety factor is established in accordance with the probable pressure to be used with the tube 30. This probable pressure usually is the normal line pressure of about 90 P.S.I. found generally in the pressurized air supply systems of the shops which are to use this chuck. Higher pressures, where encountered, only require a heavier tube to be used.

The diameter of the chuck, of course, is made to suit a particular installation and requirement as to the length of the mandrel or chuck is also made to suit the operating conditions. If an extremely long chuck is to be provided it is contemplated that the grooves 24 may be formed to permit screws 36 to be inserted into the retaining members 34 intermediate the ends of the chuck to retain and guide the movable jaws 32 to prevent distortion of the jaws during use of the chuck or mandrel.

Figure 12:
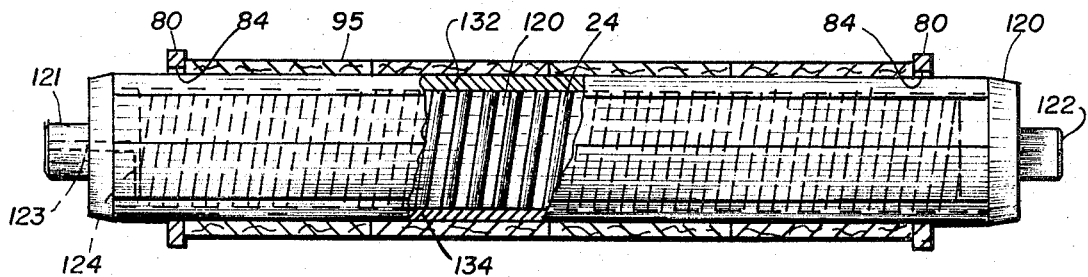
FIG. 12 represents a diagrammatic side and sectional view of the expanding mandrel of FIG. 1 as modified to provide a differential rewind shaft in which the torque is transmitted to the driven cores by expanded polished leaf members.
Figure 13:
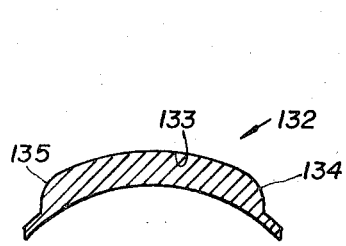
FIG. 13 represents a sectional view of a chuck jaw of FIG. 5 as modified to provide a polished leaf member of the differential rewind shaft.
Figure 14:
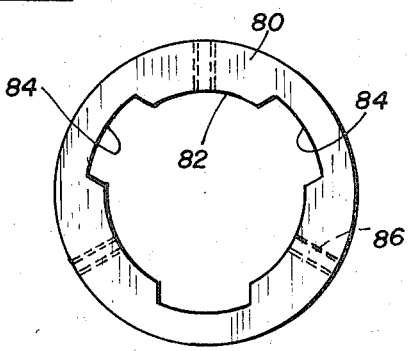
FIG. 14 represents a face view of end collars used with the rewind shaft to retain the material cores on the differential rewind shaft.

Rewind Shaft of FIGS. 12 through 14

Referring finally to the rewind assembly as seen in FIGS. 12 through 14 this rewind assembly is a modification of the expanding mandrel of FIG. 1. To provide the desired differential rewind assembly of FIG. 12 the jaw 32 (FIG. 7) instead of having its outer surface adapted for positive driving is made smooth to provide a sliding surface. As seen in FIG. 13, a movable shoe or lead 132 has its outer arcuate surface 133 polished or made smooth. Longitudinal corner portions 134 and 135 are rounded so as to eliminate any possibility of unwanted engagement with the inner surface of the cores which carry the material for rewind. The shoe or lead 132 may be made of aluminum or other metal or plastic which provides a slightly flexible material which, as it is urged outwardly, accommodates itself to a minor extent with the core which carried the material being rewound.

As seen in FIG. 12, tubing 24 is carried on a core 120 whose ends are formed to provide journals 121 and 122. Instead of the valved end as seen in FIG. 8 the end 121 is depicted as having an air passageway 123 therethrough. This passageway extends inwardly to a right angled passageway 124 leading to a groove 30 as above-described. The other end of the tubing 24 is closed as in either FIGS. 9 or 10.

Shown in FIG. 14 is a stop collar 80 having an inner bore 82 which is sized to slidably engage the three fixed retaining members 34. Relief portions 84 are sized and positioned to provide a recess into which the expanding or outward movement of shoe 132 may freely move. Threaded holes 86 are adapted to carry set screws by which the collars 80 are secured to the retaining members 34.

Use and Operation of Rewind Shaft of FIGS. 11 through 14

Figure 11:
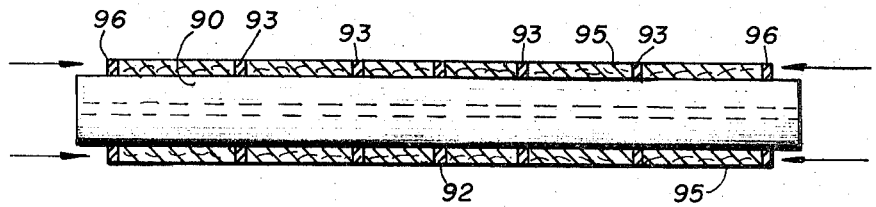
FIG. 11 represents a diagrammatic side and sectional view of a conventional rewind shaft assembly and designated as prior art.

In FIG. 11, a diagrammatic representation of a conventional rewind shaft includes a shaft 90 which conventionally has a keyway, not shown, which extends longitudinally along the outer surface of the shaft. On this shaft keyed collars are carried and rotate with the shaft. The intermediate collar 92 is usually fixed to the shaft and slidable collars 93 are positioned between cores 95 on which is rewound material not shown. End collars 96 are also slidable along the shaft 90 and as indicated by the arrows are moved inwardly by means such as pneumatic cylinders. The end loading method of FIG. 11 provides torque transmission from the shaft rotation through the friction imparted from separator collars 92, 93 and 96 to the ends of the cores 95. The loading pressures transmitted from the end external force toward the center collar have a tendency to diminish.

As reduced to practice, the rewind shaft of FIGS. 12–14 has provided a smooth rewind shaft whose exerted torque along the shaft has been equalized by the equal pressure in tube 24. Increasing or decreasing the pressure in this tube provides an immediate response in the effective torque. As the torque is equally distributed the sliding action has been very smooth rather than irregular as in prior art devices.

The chuck or mandrel may be fragmented to provide a series of engaging jaws by which the core or roll maybe supported or driven. The size of the jaws, the number of jaws and the outward travel of the jaws are merely a matter of design. The helically wound tube causes equal pressure to be exerted on the movable jaws. Replacement of jaws, retainers and tubing is easily accomplished.

Terms such as "left," "right," "up," "down," "bottom," "top," "front," "back," "in," "out" and the like are applicable to the embodiment shown and described in conjunction with the drawings. These terms are merely for the purposes of description and do not necessarily apply to the position in which the chuck or mandrel may be constructed or used.

While a particular embodiment of the mandrel has been shown and described it is to be understood the invention is not limited thereto since modifications may be made and protection is sought to the broadest extent the prior art allows.

What is claimed is:

1. An expanding mandrel, chuck, rewind and the like for transmitting torque forces in which an expanding member is actuated by air, hydraulic fluid and the like, said mandrel including: (a) an elongated body member having end portions of a determined diameter and between these end portions having an intermediate portion having a lateral surface formed with a helical groove; (b) a transverse passageway formed in one end portion, said passageway extending from this end portion inwardly to the helical groove; (c) a resilient tube mounted in said groove with one end of the tube fed to and into the transverse passageway to provide external access to the end of the tube and with the other end of the tube closed by means providing a fluid tight seal; (d) a plurality of longitudinally disposed movable members carried by and on the intermediate portion of the body, the underside of the movable members being in local contact with portions of the top surface of the resilient tube; (e) a plurality of fixed retaining members having longitudinal edges positioned in a determined array about and removably secured to the intermediate portion of the body after the tube has been mounted in the helical groove, the retaining members formed and positioned to engage and retain the remaining outer surface portions of the mounted resilient tubing, said retaining members having their longitudinal edges adapted to engage the edges of the movable members so as to cooperatively limit the outward movement of said movable members while at the same time transmitting the developed torque forces to and from the movable members to the retaining members and the body, and (f) a fluid conductive and connecting means cooperatively associated with the inlet end of the resilient tube, said conductive means permitting selective filling and discharge of pressurized air, fluid and the like to the helically arranged resilient tube to cause responsive outward and inward movement of the movable members.

2. An expanding mandrel as in claim 1 in which the transverse passageway includes a stepped hole in which is removably retained a plug having a passageway therethrough and an outer tapered surface onto which the end of the resilient tubing is mounted and onto this mounted end of the tubing is applied a cooperatively tapered sleeve member which engages and compresses the tubing to retain the tubing end to the plug in a fluid tight manner, said plug connected to a valve plug member through which air, fluid and the like may be fed to the tubing.

3. An expanding mandrel as in claim 2 in which the valve plug member is connected to the tapered plug to provide a unitary member, this valve plug member and tapered plug combination sized so as to be a sliding fit in a shouldered bore in the transverse passageway and there is provided means for removably locking this combination in the transverse passageway.

4. An expanding mandrel as in claim 3 in which the means for locking the valve and tapered plug combination in the transverse passageway is a screw which enters and is retained in cooperative threaded portions on the outer surface of the plug and in the inner surface of the shouldered bore.

5. An expanding mandrel as in claim 1 in which the means for closing the distal end of the tube is a U-shaped clamp which receives and engages a folded end of the tube and when the clamp jaws are moved toward each other they grip and squeeze the folded end of the tube into a pressure tight seal.

6. An expanding mandrel as in claim 1 in which the means for closing the distal end of the tube is a resilient plug inserted into the tube end and a circular clamp tightened on the outside of the resilient tube to grip the tube to the plug in a pressure tight manner.

7. An expanding mandrel as in claim 1 in which the resilient tube is of rubber having a low durometer such as 25 to 40 durometer.

8. An expanding mandrel as in claim 1 in which the retaining members have their outer longitudinal edges formed with extending ear portions and the movable members are jaws having their inner longitudinal edges formed with extending shoulder portions which engage the ear portions of the retaining members to limit the outward movement of the movable jaws.

9. An expanding mandrel as in claim 8 in which the movable jaws are provided with external ribs having flat outer surfaces which flat surfaces are disposed to engage the inside of a supported member which is a roll, core and the like without damage thereto while this member is supported and driven by the mandrel.

10. An expanding mandrel as in claim 1 in which the mandrel includes a differential rewind shaft on which the movable members are formed and retained with their outward core engaging portions comprising smooth arcuate surfaces which provide slip surfaces on which inner diameter portions of core sections may be carried; these core sections are retained against excessive longitudinal movement by collar members carried by and rotated with the shaft, said collar members having relief portions which provide passageways enabling in and out movement of the movable members to take place in response to pressure changes within the resilient tube, the selected extent of pressure in the tube and corresponding thrust of the movable members against the inner surfaces of the core sections establishing the effective torque to be transmitted from the movable members to the core sections.

11. An expanding mandrel as in claim 10 in which the collar members are removably secured to the shaft by screw means carried in threaded holes extending from the outer surface to an inner diameter which is sized so as to be slidable on the fixed retaining members.

12. An expanding mandrel as in claim 10 in which the fluid conductive and connecting means is a centrally positioned inlet formed in a journal portion provided at one end of the shaft, said inlet being connected to a transverse passageway so as to permit the resilient tube to be brought from one end of the helical groove to the centrally positioned inlet.

13. An expanding mandrel as in claim 10 in which there are not less than three movable members, each having its outer longitudinal edges rounded so as to preclude unwanted engagement with a core member as the core member is rotated relative thereto.

* * * * *